(12) United States Patent
Hasselskog

(10) Patent No.: US 12,054,225 B2
(45) Date of Patent: Aug. 6, 2024

(54) METHOD AND CONTROLLER UNIT FOR CONTROLLING MOTION OF A HYDROFOIL WATERCRAFT

(71) Applicant: Candela Technology AB, Lidingö (SE)

(72) Inventor: Gustav Hasselskog, Stockholm (SE)

(73) Assignee: CANDELA TECHNOLOGY AB, Lidingo (SE)

( * ) Notice: Subject to any disclaimer, the term of this patent is extended or adjusted under 35 U.S.C. 154(b) by 280 days.

(21) Appl. No.: 17/737,144

(22) Filed: May 5, 2022

(65) Prior Publication Data

US 2022/0355902 A1 Nov. 10, 2022

(30) Foreign Application Priority Data

May 6, 2021 (SE) .................................. 2150582-1

(51) Int. Cl.
*B63B 1/28* (2006.01)
*B63B 79/10* (2020.01)
*B63B 79/40* (2020.01)

(52) U.S. Cl.
CPC .............. *B63B 1/285* (2013.01); *B63B 79/10* (2020.01); *B63B 79/40* (2020.01)

(58) Field of Classification Search
CPC .......... B63B 1/285; B63B 79/40; B63B 79/10
See application file for complete search history.

(56) References Cited

U.S. PATENT DOCUMENTS

| 6,376,831 B1 | 4/2002 | Nguyen |
| 2005/0278094 A1 | 12/2005 | Swinbanks et al. |
| 2014/0114509 A1 | 4/2014 | Venables et al. |
| 2015/0323322 A1 | 11/2015 | Huntsberger et al. |
| 2018/0372494 A1 | 12/2018 | Tamashima et al. |

FOREIGN PATENT DOCUMENTS

| CN | 110937076 A | 3/2020 |
| CN | 112099110 A | 12/2020 |
| EP | 3096193 A1 | 11/2016 |
| GB | 2527055 A | 12/2015 |
| JP | 2005306188 A | 11/2005 |
| JP | 4640760 B2 | 3/2011 |
| WO | 2016109601 A1 | 7/2016 |

OTHER PUBLICATIONS

Swedish Search Report issued by the Swedish Patent And Registration Office in Patent Application No. 215582-1, completed Jan. 1, 2022, 3 pages.

*Primary Examiner* — Michael D Lang
(74) *Attorney, Agent, or Firm* — Schott, PC

(57) ABSTRACT

A method and a controller unit for controlling motion of a watercraft with a hydrofoil) obtains information indicating shape of water surface in front of the hydrofoil. The controller unit further predicts wave acceleration of the watercraft using a neural network. Furthermore, the controller unit determines a target route and corresponding total acceleration of the watercraft under a set of constraints. The total acceleration is minimized when the watercraft travels according to the target route. The set of constraints includes: a first constraint that the hydrofoil stays within an interval relative to the water surface, and a second constraint relating to magnitude of acceleration derived from maximum AoA and the predicted wave acceleration. The controller unit calculates an AoA for the target route. Next, the controller unit sends a signal for adjusting the hydrofoil according to the AoA.

9 Claims, 3 Drawing Sheets

METHOD AND CONTROLLER UNIT FOR CONTROLLING MOTION OF A HYDROFOIL WATERCRAFT

FIELD OF THE INVENTION

Embodiments herein relate motion control of watercrafts, such as hydrofoil watercrafts. In particular, a method and a controller unit for controlling motion of a watercraft with a hydrofoil are disclosed. A corresponding computer program and a computer program carrier are also disclosed.

BACKGROUND

All watercrafts, such as boats, ships, water vessels or the like, are impacted by waves causing vertical and rotational accelerations, such as roll, yaw and pitch, to the watercraft.

Most waves are created by wind flowing over the water surface generating a shear stress which deforms the surface. In such a process, the frequencies and amplitudes show a high variance, i.e. no single dominant frequency can be found. The waves can be said to be unorderly. However, the mean amplitude increases and the mean frequency decreases with increasing wind speed and time. Following a process that can be described with Laplace's equation, high frequencies will over time get dampened and a dominant frequency starts to appear. Therefore, so called ocean waves, having space and time for the described process to operate, are relatively orderly. However, in more sheltered waters and in waters where the wind is still impacting the surface, the waves are less orderly. In such conditions, knowledge about one wave has limited predictive value with regards to the next.

A hydrofoil boat with fully submerged foils and automatic height control has unique capabilities to run in waves while reducing the accelerations otherwise caused by the waves. This is the case since an upward wave does not shoot the boat out of the water making the boat crash into the next wave. Instead, a smooth ride is achieved by having the foil submerged, and height and angles of the boat are controlled by a motion control system.

Also boats with surface piercing hydrofoils can, at least to some extent, run in waves when the boat is exposed to relatively low accelerations, especially compared to common displacement or planning boats.

Traditional control systems for hydrofoils act reactively on measurements of height and angles using various known control procedures.

With more advanced control systems, various techniques for predicting waves approaching the boat has been used to improve motion control.

JP4640760B2 discloses a ship with a submerged hydrofoil and a waveform predicting method. An operation control device comprises an ocean wave model identifying module for predicting and calculating the arriving ocean wave form in real time, and a nonlinear on-line model prediction control module that calculates an operation amount establishing a condition where an evaluation function about the period from the present time to a predetermined future time becomes a minimum value or a maximum value based on an amount related to the state of the ship body in real time. A problem with the solution of JP4640760B2 appears to be that it assumes that future waves will have similar shapes as in past waves. This makes the innovation limited to orderly ocean waves. The applicability of JP4640760B2 in other scenarios where the wave shape has a higher variance is therefore limited.

As another known example, Model Predictive Control (MPC) can be used for guidance and trajectory tracking problems in connection with ship movements. An MPC controller can be used to control the transversal, longitudinal and rotational velocities of the ships. A control system based on MPC is robust and can be used in many real situations.

A problem is, nevertheless, that in some scenarios, the control of the boat may still need further improvements, e.g. in terms of reduced accelerations. Reduced accelerations are typically perceived by a passenger of the boat as more comfortable and/or smooth.

SUMMARY

A particular object of the present invention may be to improve existing system for motion control to achieve a more comfortable and/or smooth ride.

In view of the abovementioned problem, the present inventor has realized that a remaining problem with the known solutions is how to achieve a smooth ride for a watercraft with submerged hydrofoils in an environment with no wave frequency being both dominant and constant or close to constant over time. In such a case, historical data cannot be used to predict the future wave form and movements.

In particular, unlike a displacement and planning watercrafts, a watercraft equipped with a submerged hydrofoil is not impacted by the surface of the wave as such but by rotating water particles below the surface of the wave, i.e. within the wave. Nevertheless, the shape of the water surface in front of the hydrofoil comprises information about how such rotating water particles will impact motion of the watercraft.

According to an aspect, the object is achieved by a method, performed by a controller unit, for controlling the motion of a watercraft with a hydrofoil. The controller unit obtains information indicating shape of water surface in front of the hydrofoil. The controller unit predicts wave acceleration of the watercraft using a neural network. The neural network is trained to output the wave acceleration using training data for the neural network. The training data is derived from information indicating shape of water surface in front of the hydrofoil, speed of the watercraft, angle of attack of the hydrofoil, "AoA", and measured acceleration. The controller unit determines a target route and corresponding total acceleration of the watercraft under a set of constraints. The total acceleration, i.e. the corresponding total acceleration, is minimized when the watercraft travels according to the target route. The set of constraints includes a first constraint that the hydrofoil stays within an interval relative to the water surface, and a second constraint relating to magnitude of acceleration derived from maximum AoA and the predicted wave acceleration. The controller unit calculates an AoA for the target route based on a difference between the total acceleration, i.e. the corresponding total acceleration, as given by the target route and the predicted wave acceleration. The controller unit sends a signal for adjusting the hydrofoil according to the AoA, thereby controlling the motion of the watercraft.

Thanks to the embodiments herein, influence from rotating water particles on acceleration(s) of the watercraft is taken into account, when calculating the angle of attack based on the target route and the predicted wave acceleration. In this manner, the watercraft may be controlled to reduce accelerations during cruising.

An advantage is that the watercraft rides in a manner that is perceived as more comfortable by the driver/passenger(s)

of the watercraft, i.e. due to smoother ride over the waves while having less accelerations. Thanks to the embodiments herein, the ride may become smoother also in irregular and/or fast changing waves, in which for example the aforementioned JP4640760B2 likely would fail, or at least perform worse than the present invention.

BRIEF DESCRIPTION OF THE DRAWINGS

The various aspects of embodiments disclosed herein, including particular features and advantages thereof, will be readily understood from the following detailed description and the accompanying drawings, which are briefly described in the following.

DETAILED DESCRIPTION

Figure 1:
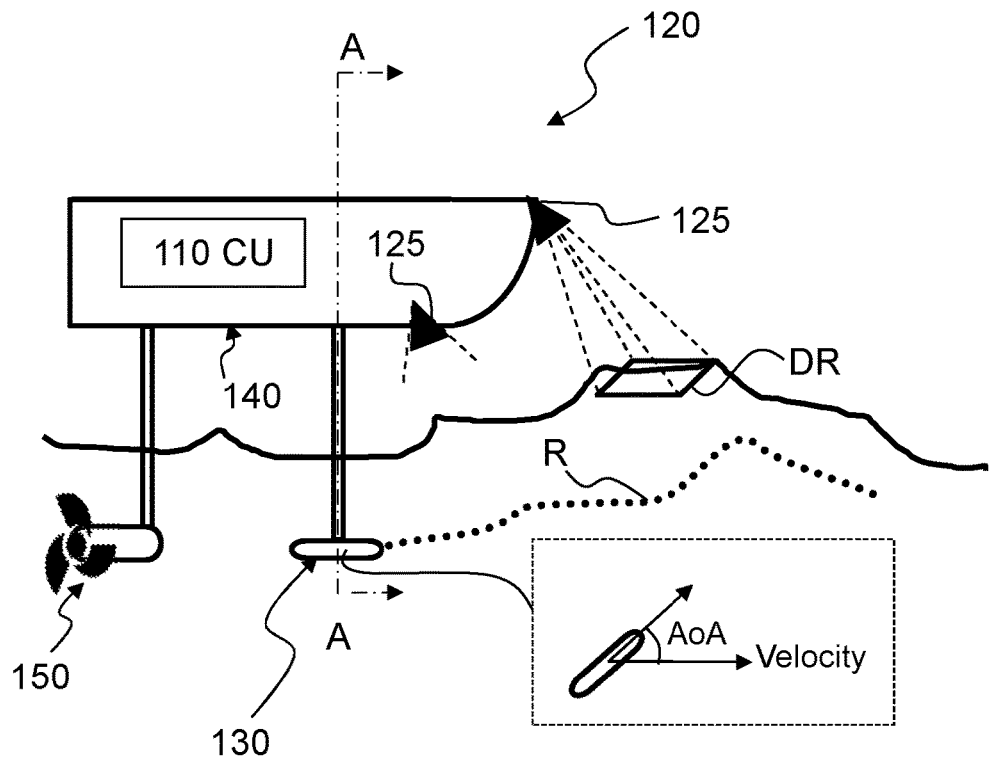
FIG. 1 is a side view illustrating an exemplifying hydrofoil watercraft according to some embodiments herein.

Throughout the following description, similar reference numerals have been used to denote similar features, such as actions, modules, circuits, parts, items, elements, units or the like, when applicable. In the Figures, features that appear in some embodiments are indicated by dashed lines.

FIG. 1 depicts an exemplifying watercraft 120 having a hydrofoil 130. The hydrofoil 130 may be a fully submerged hydrofoil, a surface piercing hydrofoil or the like. The watercraft 120 may be a boat, a ship, a water vessel or the like.

The watercraft 120 has a hull 140, which extends along the longitudinal direction of the watercraft 120.

The watercraft 120 comprises a propulsion unit 150, such as a motor, an engine or the like. In preferred embodiments, the propulsion unit 150 is an electric motor. The propulsion unit 150 may also act as a rudder and/or a rear hydrofoil. Notably, as used herein the term "hydrofoil" is generally used to refer to the previously mentioned hydrofoil 130 However, the watercraft 120 may also or alternatively be provided with a rudder and/or rear hydrofoil that is/are separate from the propulsion unit 150.

In some examples, the propulsion unit 150 may be located within the hull 140 of the watercraft 120, or at least above a surface of the water when the watercraft 120 is cruising. A set of gears and/or sprockets may then transfer power from the propulsion unit 150 to a propeller or the like.

Generally, the watercraft 120 is capable of motion in six degrees: surge, sway, heave, roll, pitch and yaw. In a cartesian coordinate system, x-axis may denote a longitudinal direction with respect to the watercraft 120, y-axis may denote a transversal direction with respect to the watercraft 120 and z-axis may denote a vertical direction with respect to the watercraft 120.

The surge, sway and heave are translational motions. Surging is the motion along the longitudinal x-axis, swaying is the motion along the transverse y-axis, and heaving is the transversal motion along the vertical z-axis. Rolling is a rotation around the longitudinal x-axis, pitching is a rotation around the transverse y-axis and yawing is a rotation around the vertical z-axis.

The watercraft 120 may be provided with one or more sensor devices 125, referred to as "a/the sensor device 125" for reasons of simplicity. The sensor device may comprise a 3d-shape detecting unit, an image sensor, a camera, a video camera, a light detection and ranging sensor, 3D-laser scanner unit, laser imaging detection and ranging sensor, LIDAR-unit, a radar sensor, or the like.

As illustrated in FIG. 1, the angle of attack is the angle of the hydrofoil relative a direction of movement of the watercraft, or a velocity direction of the watercraft. The angle of attack is adjusted by means of a hydrofoil actuation system (not shown). The hydrofoil actuation system may comprise one or more of e.g. one or more actuators for adjusting the angle, electronics, electric motors, the hydrofoil itself and the like.

The watercraft 120 comprises a controller unit 110, which is configured to obtain information from said one or more sensor device 125. Based on the information, the controller unit 110 sends a signal to the hydrofoil actuation system (not shown) for controlling motion of the watercraft 120, e.g. to achieve a smooth and comfortable ride.

Figure 2:
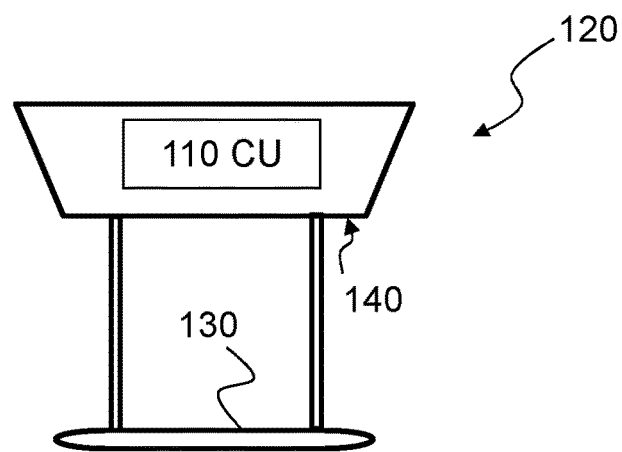
FIG. 2 is a cross-sectional view according to the line AA of FIG. 1.

Moreover, FIG. 2 illustrates a side view in the cross-section AA of FIG. 1.

As used herein, the term "in front of the hydrofoil" may refer to that the sensor device monitors and/or detects shape of the water surface under and/or in front of the watercraft, such as in a detection region, denoted "DR" in FIG. 1. This means that the detection region includes the water surface whose shape is detected and/or monitored. As an example, the detection region may extend from the hydrofoil to the bow of the watercraft. Sometimes, the detection region extends somewhat beyond, i.e. forwards of the bow. As another example, the detection region may extend from the hydrofoil or the bow and forwards up to a range of up to three times a longitudinal length of the watercraft or the like. The detection region may have a lateral extension that ranges from a few centimetres up to a width of the watercraft and even somewhat beyond the width of the watercraft.

As used herein, the term "speed of watercraft" may refer to speed relative ground or speed relative the water, which commonly are referred to as speed over ground and speed over water, respectively, in related literature.

As used herein, the term "shape of water", "shape of water surface" may refer to a surface of the water, an area/region of water in front of the hydrofoil and the like.

As used herein, the term "acceleration" refers to acceleration of the watercraft, unless otherwise evident from the context.

The term "wave acceleration" refers to acceleration imposed on the hydrofoil due to rotating and/or orbiting water particles within the waves. The wave may thus be said to include a rotating and/or orbiting stream, such as flow or the like, of water particles that either increases or decreases the lift force imposed on the hydrofoil when travelling through the wave.

The term "measured acceleration" refers to a total acceleration caused to the watercraft and/or hydrofoil due to one or more of: AoA of hydrofoil, gravitation and rotating water particles within the wave, and the like. Since the hydrofoil is mounted to the watercraft, any acceleration to one of them will be perceived in both. For all practical purposes, acceleration of the watercraft and the hydrofoil is the same. Moreover, measured acceleration refers to all accelerations that the watercraft as well as the hydrofoil are exposed to, since the measured acceleration is measured by a device. Therefore, measured acceleration refers to total acceleration caused to the watercraft.

The term "predicted acceleration" refers to a total predicted acceleration derived from shape of the water in front of the hydrofoil, speed and planned route, or planned AoA.

As used herein, the term "watercraft attitude", "attitude of the watercraft", "attitude" or the like may refer to tilt or rotation about any one of the three axis of the cartesian coordinate system, i.e. x-, y- and z-axis. Accordingly, the attitude may specify one or more degrees as a measure of one or more of roll, pitch and yaw.

Figure 3:
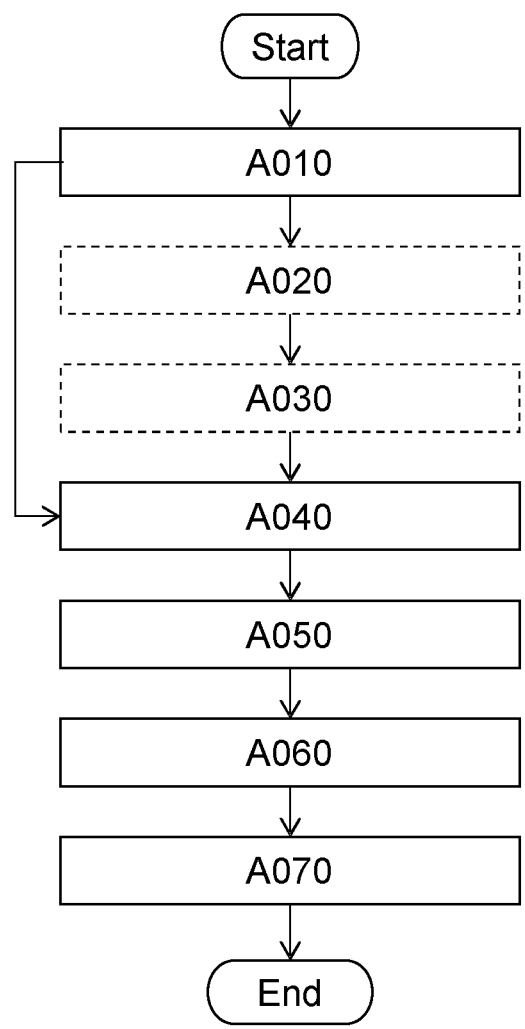
FIG. 3 is a flowchart illustrating an exemplifying method according to some embodiments herein.

FIG. 3 illustrates an exemplifying method according to the embodiments herein. The controller unit 110 performs a method for controlling motion of the watercraft 120 with the hydrofoil 130.

One or more of the following actions may be performed in any suitable order.

Action A010

The controller unit 110 obtains information indicating shape of water surface in front of the hydrofoil 130. The information may be obtained, such as collected, gathered or the like, by the sensor device 125. The information may include one or more of image data, video data, 3D-shape information or the like.

In one example, the controller unit 110 may capture the information indicating shape of water surface in front of the hydrofoil 130, e.g. repeatedly at a frequency. The frequency may be fixed or dynamically determined, e.g. based on the speed of the watercraft 120 or the like. In this example, action A010 means that the controller unit 110 generates a time series of data blocks, such as a vector, a matrix or the like. Each data block of the time series comprises information indicating shape of the water surface for a respective time slot.

A distance between the detection region and the hydrofoil 130 is known, to the controller unit 110, according to the design of the watercraft 120. Since the speed also is known, to the controller unit 110, the controller unit 110 may also determine, or predict, when a captured detection region reaches and affects motion of the hydrofoil 130.

For reasons of simplicity, the following discussion focuses on a current time slot for which the controller unit 110 has obtained the time series of data blocks, where the last data block is associated with the current time slot.

As a result of action A010, the controller unit 110 obtains information to be used in action A040. In some examples, action A010 may comprise actions A020 and A030 below.

Action A020

The controller unit 110 may receive, from at least one sensor, such as exemplified above by the sensor device 125, raw data representing the water in front of the hydrofoil 130. The sensor device 125 is typically directed towards the water surface in front of the hydrofoil 130.

Action A030

The controller unit 110 may determine the information as a quantized representation the raw data.

As an example, the controller unit 110 may thus allow the received information to be represented by the information, e.g. in the form of a point grid. Thereby, the amount of information is reduced to shorten processing time, reduce memory requirements for the processing etc.

Action A040

The controller unit 110 predicts wave acceleration of the watercraft 120 using a neural network. The neural network is trained to output the wave acceleration using training data for the neural network. The training data is derived from information indicating shape of water surface in front of the hydrofoil 130, speed of the watercraft 120, angle of attack of the hydrofoil 130, "AoA", and measured acceleration.

The wave acceleration refers to acceleration caused by rotating water particles under the water surface in front of the hydrofoil 130. The neural network may be trained to output the wave acceleration in the following exemplifying manner. The measured acceleration gives the neural network information about a total acceleration of the watercraft 120. Moreover, the speed of the watercraft 120 and the angle of attack of the hydrofoil 130 gives the neural network information about an expected acceleration in the case wave acceleration is not accounted for. This means that the training data allows a difference between the expected and the measured acceleration to be observed, or calculated, where that difference is the wave acceleration. Thus, the neural network is able to predict the wave acceleration after being trained with the training data.

In some examples, the training data further comprises a measured distance between watercraft and the water surface, and a measured watercraft attitude and the like.

|  | Exemplifying training data | Optional |
| --- | --- | --- |
| Input | information indicating shape of water surface in front of the hydrofoil | |
|  | speed of the watercraft | |
|  | angle of attack of the hydrofoil | |
|  | measured distance between watercraft and the water surface | X |
|  | measured watercraft attitude | X |
| Output | wave acceleration calculated as the difference as explained above | |

Accordingly, in order to set up the training data as above, it is typically required to process, such as pre-process, the information indicating shape of water surface in front of the hydrofoil 130, the speed of the watercraft 120, the AoA, and the measured acceleration to obtain the wave acceleration, which may be used as output of the training data.

As an example, using the neural network may mean that a set of input values, such as the information indication shape of water, the speed, the AoA or the like as in the table above, are feed into the neural network, which then outputs wave acceleration, e.g. for the current time slot and subsequent time slots, according to how the neural network has been trained.

The wave acceleration preferably relates to acceleration along the z-axis and/or rotation about the x and the y-axis, but it is not limited thereto. The wave acceleration may thus relate to acceleration in any one or more of the six degrees of freedom discussed herein. Accordingly, the motion of the watercraft 120 may concern rotation about and/or translation along one or more of three spatial axes of the cartesian coordinate system mentioned above. Therefore, in more detail, the predicted wave acceleration may comprise a respective wave acceleration for each degree of freedom.

The measured acceleration of the training data may be derived from one or more of an accelerometer, a gyro, a distance measurement device, gps, barometer or the like. Any manner of obtaining the measured acceleration may be used. For example, the distance measurement device may be used and then the measured acceleration may be determined as the $2^{nd}$ derivative of distance with respect to time.

Action A050

The controller unit 110 determines a target route R and corresponding total acceleration of the watercraft 120 under a set of constraints. As an example, this means that the controller unit 110 determines the target route R while minimizing the total corresponding acceleration and while complying with the set of constraints.

The set of constraints includes:
A first constraint that the hydrofoil 130 stays within an interval relative to the water surface.
A second constraint relating to magnitude of acceleration derived from a maximum AoA and the predicted wave acceleration. The magnitude may be a threshold value for which the smooth ride is perceived. The maximum AoA is typically determined by the performance of the hydrofoil actuation system.

In some examples, the set of constraints further includes:
A third constraint relating to a rate of change in acceleration as determined by the performance of the hydrofoil actuation system.
any additional similar or otherwise useful constraints.

With the second and/or third constraints, limitations of the hydrofoil actuation system are taken into account, optionally while also considering the predicted wave acceleration.

Concerning the first constraint, the interval may be determined relative an average water surface, e.g. over a certain time period and/or detection region. The interval may further be set to avoid powerful accelerations due to loss of lift force on the hydrofoil and/or due to collision between the hull of the watercraft and the water, i.e. the surface of the water. The loss of lift force on the hydrofoil shall be avoided, but may happen if the hydrofoil leaves the water, in particular if a fully submerged hydrofoil steers out of the water. Nevertheless, the interval may still allow that the submerged hydrofoil temporarily leaves the water, completely or partially, provided that the lift force remains sufficiently large, i.e. greater than gravitation and/or acceleration forces of the watercraft over a defined time period. The defined period may be less than 2 s, preferably less than 0.5 s and most preferably less than 0.1 s.

Concerning the second constraint, it may be noted that the predicted wave acceleration may sometimes increase the magnitude of acceleration and sometimes decrease the magnitude of acceleration. That is to say, the second constraint is varying as the predicted wave acceleration varies with the time slot under observation.

There exist various methodologies, such as Model Predictive Control, that e.g. minimizes a given measure while evaluating various options, for determining a route while complying with one or more constraints. However, the embodiments herein apply the second constraint that takes into account the predicted wave accelerations and, as explained below, the calculation of the AoA takes into account the predicted wave acceleration. Other control methods may be used, while still conforming to an idea of the present invention, i.e. that of taking predicted wave accelerations into account when applying a constraint, such as the second constraint above, and calculating the AoA.

The total acceleration is minimized, or at least maintained at a low level, when the watercraft 120 travels along the target route R. The minimized total acceleration may refer to that a measure, such as a cost function, of the total acceleration is minimized. The measure, or cost function, may be the sum of the absolute values of the total accelerations for each time slot, the maximum absolute value among the total acceleration in all time slots, the sum of the square of the total acceleration for each time slot or the like.

As a result of action A050, the controller unit 110 may determine the target route R for the current time slot. Action A050 may thus be repeatedly performed, e.g. as new predicted wave accelerations are calculated, which in turn are calculated as new information about the shape of the water surface becomes available in action A010.

Action A060

Next, the controller unit 110 calculates an AoA for the target route based on a difference between the total acceleration as given by the target route and the predicted wave acceleration. It is typically sufficient that the AoA is calculated for the current time slot.

Within the field of hydrofoil technology, the AoA needed to generate a certain acceleration is commonly calculated according to known manners. The acceleration is proportional to the AoA and the constant of proportionality is a function of the water's density, area of the hydrofoil, the mass of the watercraft and the square of the speed of the watercraft.

Action A070

The controller unit 110 sends a signal for adjusting the hydrofoil 130 according to the AoA, thereby controlling the motion of the watercraft 120. The signal is sent to an actuator (not shown) that adjusts the angle of the hydrofoil. In this manner, the AoA of the hydrofoil is adjusted and consequently the motion of the watercraft 120 is controlled.

Next, the controller unit 110 may proceed with action A010 in order to obtain new information indicating shape of the water surface to be processed as described above.

The embodiments herein advantageously take wave acceleration into account both when setting the constraints for determination of the target route as well as when calculating the AoA. Thereby, controlling motion of the watercraft 120 in a manner that is perceived as more comfortable by passengers of the watercraft 120.

Figure 4:
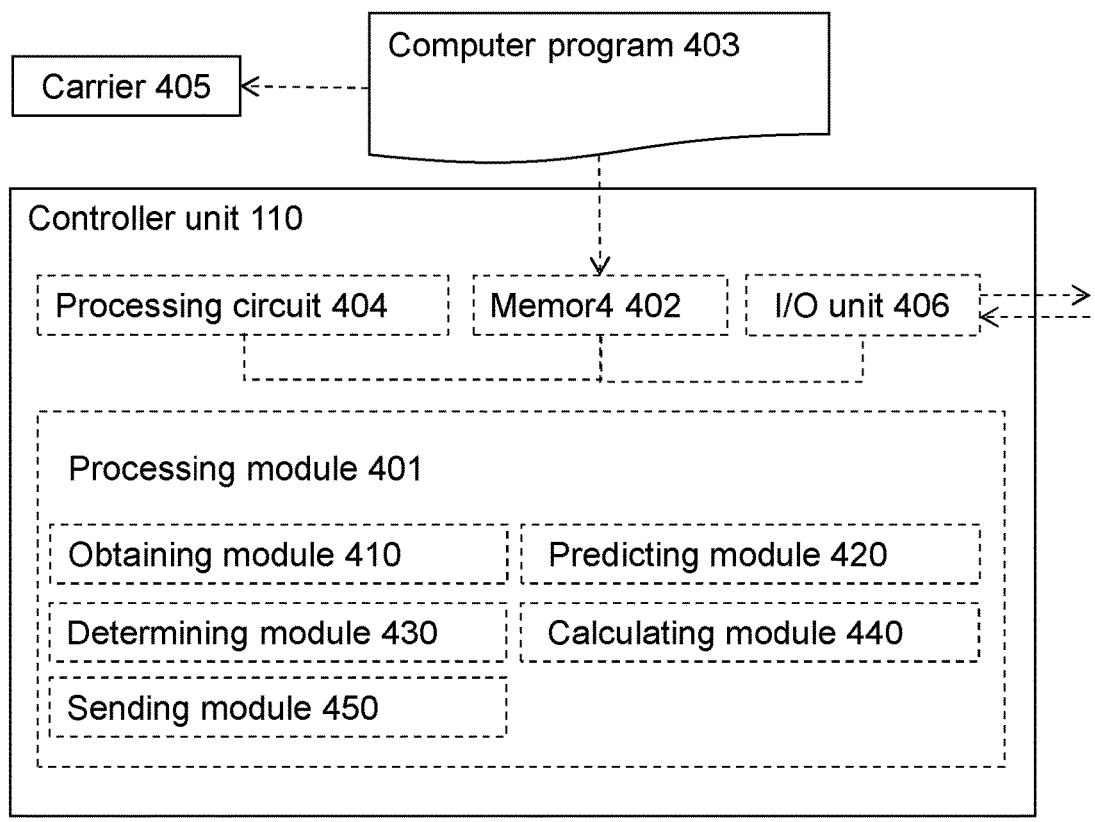
FIG. 4 is a block diagram illustrating an exemplifying control unit according to some embodiments herein.

With reference to FIG. 4, a schematic block diagram of embodiments of the controller unit 110 of FIG. 1 is shown.

The controller unit 110 may comprise a processing unit 401, such as a means for performing the methods described herein. The means may be embodied in the form of one or more hardware units and/or one or more software modules. The term "module" may thus refer to a circuit, a software block or the like according to various embodiments as described below.

The controller unit 110 may further comprise a memory 402. The memory may comprise, such as contain or store, instructions, e.g. in the form of a computer program 403, which may comprise computer readable code units.

According to some embodiments herein, the controller unit 110 and/or the processing module 401 comprises a processing circuit 404 as an exemplifying hardware module. Accordingly, the processing module 401 may be embodied in the form of, or 'realized by', the processing circuit 404. The instructions may be executable by the processing circuit 404, whereby the controller unit 110 is operative to perform the methods of FIG. 2. As another example, the instructions, when executed by the controller unit 110 and/or the processing circuit 404, may cause the controller unit 110 to perform the method according to FIG. 2.

In view of the above, in one example, there is provided a controller unit 110 for controlling motion of a watercraft 120 with a hydrofoil 130. Again, the memory 402 contains the instructions executable by said processing circuit 404 whereby the controller unit 110 is operative for:

obtaining A010 information indicating shape of water surface in front of the hydrofoil 130,
predicting A040 wave acceleration of the watercraft 120 using a neural network, wherein the neural network is trained to output the wave acceleration using training data for the neural network, wherein the training data is derived from information indicating shape of water surface in front of the hydrofoil 130, speed of the watercraft 120, angle of attack of the hydrofoil 130, "AoA", and measured acceleration, determining A050 a target route and corresponding total acceleration of the watercraft 120 under a set of constraints, wherein the total acceleration is minimized when the watercraft 120 travels according to the target route, wherein the set of constraints includes:

a first constraint that the hydrofoil 130 stays within an interval relative to the water surface, and a second constraint relating to magnitude of acceleration derived from maximum AoA and the predicted wave acceleration, and calculating A060 an AoA for the target route based on a difference between the total acceleration as given by the target route and the predicted wave acceleration, and sending A070 a signal for adjusting the hydrofoil 130 according to the AoA, thereby controlling the motion of the watercraft 120.

FIG. 4 further illustrates a carrier 405, or program carrier, which provides, such as comprises, mediates, supplies and the like, the computer program 403 as described directly above. The carrier 405 may be one of an electronic signal, an optical signal, a radio signal and a computer readable medium.

In further embodiments, the controller unit 110 and/or the processing module 401 may comprise one or more of an obtaining module 410, a predicting module 420, a determining module 430, a calculating module 440, and a sending module 450 as exemplifying hardware modules. The term "module" may refer to a circuit when the term "module" refers to a hardware module. In other examples, one or more of the aforementioned exemplifying hardware modules may be implemented as one or more software modules.

Moreover, the controller unit 110 and/or the processing module 401 may comprise an Input/Output module 406, which may be exemplified by the receiving module and/or the sending module when applicable.

Accordingly, the controller unit 110 is configured for controlling motion of a watercraft 120 with a hydrofoil 130.

Therefore, according to the various embodiments described above, the controller unit 110 and/or the processing module 401 and/or the processing circuit 404 and/or the obtaining module 410 is configured for obtaining information indicating shape of water surface in front of the hydrofoil 130.

The controller unit 110 and/or the processing module 401 and/or the processing circuit 404 and/or the predicting module 420 is configured for predicting wave acceleration of the watercraft 120 using a neural network, wherein the neural network is trained to output the wave acceleration using training data for the neural network, wherein the training data is derived from information indicating shape of water surface in front of the hydrofoil 130, speed of the watercraft 120, angle of attack of the hydrofoil 130, "AoA", and measured acceleration.

Moreover, the controller unit 110 andor the processing module 401 andor the processing circuit 404 andor the determining module 430 is configured for determining a target route and corresponding total acceleration of the watercraft 120 under a set of constraints, wherein the total acceleration is minimized when the watercraft 120 travels according to the target route, wherein the set of constraints includes:

a first constraint that the hydrofoil 130 stays within an interval relative to the water surface, and a second constraint relating to magnitude of acceleration derived from maximum AoA and the predicted wave acceleration.

Furthermore, the controller unit 110 andor the processing module 401 andor the processing circuit 404 andor the calculating module 440 is configured for calculating an AoA for the target route based on a difference between the total acceleration as given by the target route and the predicted wave acceleration.

Additionally, the controller unit 110 andor the processing module 401 andor the processing circuit 404 andor the sending module 450 is configured for sending a signal for adjusting the hydrofoil 130 according to the AoA, thereby controlling the motion of the watercraft 120.

The controller unit 110 and/or the processing module 401 and/or the processing circuit 404 and/or a receiving module may be configured for receiving, from at least one sensor directed towards the water in front of the hydrofoil 130, raw data representing the water in front of the hydrofoil 130.

Moreover, the controller unit 110 and/or the processing module 401 and/or the processing circuit 404 and/or a determining module may be configured for determining the information as a quantized representation the raw data.

The measured acceleration of the training data may be derived from one or more of an accelerometer, a gyro and a distance measurement device.

The training data may further be derived from a measured distance between watercraft and the water surface, and a measured watercraft attitude.

The motion of the watercraft 120 may concern rotation about and/or translation along one or more of three spatial axes of a cartesian coordinate system.

As used herein, the term "unit" may refer to one or more functional units, each of which may be implemented as one or more hardware units and/or one or more software units and/or a combined software/hardware unit in a node. In some examples, the unit may represent a functional unit realized as software and/or hardware of the node.

As used herein, the term "computer program carrier", "program carrier", or "carrier", may refer to one of an electronic signal, an optical signal, a radio signal, and a computer readable medium. In some examples, the computer program carrier may exclude transitory, propagating signals, such as the electronic, optical and/or radio signal. Thus, in these examples, the computer program carrier may be a non-transitory carrier, such as a non-transitory computer readable medium.

As used herein, the term "processing unit" may include one or more hardware units, one or more software units or a combination thereof. Any such unit, be it a hardware, software or a combined hardware-software unit, may be a determining means, estimating means, capturing means, associating means, comparing means, identification means, selecting means, receiving means, sending means or the like as disclosed herein. As an example, the expression "means" may be a unit corresponding to the units listed above in conjunction with the Figures.

As used herein, the term "software unit" may refer to a software application, a Dynamic Link Library (DLL), a software component, a software module, a software object, an object according to Component Object Model (COM), a software function, a software engine, an executable binary software file or the like.

The terms "processing unit" or "processing circuit" may herein encompass a processing unit, comprising e.g. one or more processors, an Application Specific Integrated Circuit (ASIC), a Field-Programmable Gate Array (FPGA) or the like. The processing circuit or the like may comprise one or more processor kernels.

As used herein, the expression "configured to/for" may mean that a processing circuit is configured to, such as adapted to or operative to, by means of software configuration and/or hardware configuration, perform one or more of the actions described herein.

As used herein, the term "action" may refer to an action, a step, an operation, a response, a reaction, an activity or the like. It shall be noted that an action herein may be split into two or more sub-actions as applicable. Moreover, also as applicable, it shall be noted that two or more of the actions described herein may be merged into a single action.

As used herein, the term "memory" may refer to a hard disk, a magnetic storage medium, a portable computer diskette or disc, flash memory, random access memory (RAM) or the like. Furthermore, the term "memory" may refer to an internal register memory of a processor or the like.

As used herein, the term "computer readable medium" may be a Universal Serial Bus (USB) memory, a Digital Versatile Disc (DVD), a Blu-ray disc, a software unit that is received as a stream of data, a Flash memory, a hard drive, a memory card, such as a MemoryStick, a Multimedia Card (MMC), Secure Digital (SD) card, etc. One or more of the aforementioned examples of computer readable medium may be provided as one or more computer program products.

As used herein, the term "computer readable code units" may be text of a computer program, parts of or an entire binary file representing a computer program in a compiled format or anything there between.

As used herein, the expression "transmit" and "send" are considered to be interchangeable.

As used herein, the terms "number" and/or "value" may be any kind of digit, such as binary, real, imaginary or rational number or the like. Moreover, "number" and/or "value" may be one or more characters, such as a letter or a string of letters. "Number" and/or "value" may also be represented by a string of bits, i.e. zeros and/or ones.

As used herein, the terms "first", "second", "third" etc. may have been used merely to distinguish features, apparatuses, elements, units, or the like from one another unless otherwise evident from the context.

As used herein, the term "subsequent action" may refer to that one action is performed after a preceding action, while additional actions may or may not be performed before said one action, but after the preceding action.

As used herein, the term "set of" or "vector comprising" may refer to one or more of something. E.g. a set of devices may refer to one or more devices, a set of parameters may refer to one or more parameters or the like according to the embodiments herein.

As used herein, the expression "in some embodiments" has been used to indicate that the features of the embodiment described may be combined with any other embodiment disclosed herein. Thus, each embodiment, example or feature disclosed herein may, when physically possible, be combined with one or more other embodiments, examples, or features disclosed herein.

Furthermore, many different alterations, modifications and the like of the embodiments herein may be become apparent for those skilled in the art. The described embodiments are therefore not intended to limit the scope of the present disclosure.

I claim:

1. A method, performed by a controller unit (110), for controlling motion of a watercraft (120) with a hydrofoil (130), wherein the method comprises:
   obtaining (A010) information indicating shape of water surface in front of the hydrofoil (130),
   predicting (A040) wave acceleration of the watercraft (120) using a neural network, wherein the neural network is trained to output the wave acceleration using training data for the neural network, wherein the training data is derived from information indicating shape of water surface in front of the hydrofoil (130), speed of the watercraft (120), angle of attack of the hydrofoil (130), "AoA", and measured acceleration,
   determining (A050) a target route and corresponding total acceleration of the watercraft (120) under a set of constraints, wherein the total acceleration is minimized when the watercraft (120) travels according to the target route, wherein the set of constraints includes:
   a first constraint that the hydrofoil (130) stays within an interval relative to the water surface, and
   a second constraint relating to magnitude of acceleration derived from maximum AoA and the predicted wave acceleration, and
   calculating (A060) an AoA for the target route based on a difference between the total acceleration as given by the target route and the predicted wave acceleration, and
   sending (A070) a signal for adjusting the hydrofoil (130) according to the AoA, thereby controlling the motion of the watercraft (120).

2. The method according to claim 1, wherein the measured acceleration of the training data is derived from one or more of an accelerometer, a gyro and a distance measurement device.

3. The method according to claim 1, wherein the training data further is derived from a measured distance between watercraft and the water surface, and a measured watercraft attitude.

4. The method according to claim 1, wherein the obtaining (A010) of the information comprises:
   receiving (A020), from at least one sensor directed towards the water in front of the hydrofoil (130), raw data representing the water in front of the hydrofoil (130), and
   determining (A030) the information as a quantized representation the raw data.

5. The method according to claim 1, wherein the motion of the watercraft (120) concerns rotation about and/or translation along one or more of three spatial axes of a cartesian coordinate system.

6. A controller unit (110) configured to perform the method according to claim 1.

7. A hydrofoil watercraft (120) comprising a controller unit (110) according to claim 6, wherein the hydrofoil (130) preferably comprises a fully submerged hydrofoil (130).

8. A computer program (403), comprising computer readable code units which when executed on a controller unit (110) causes the controller unit (110) to perform the method according to claim 1.

9. A carrier (405) comprising the computer program according to claim 8, wherein the carrier (405) is one of an electronic signal, an optical signal, a radio signal and a computer readable medium.

* * * * *